US008158842B2

(12) United States Patent
McCall

(10) Patent No.: US 8,158,842 B2
(45) Date of Patent: Apr. 17, 2012

(54) PRODUCTION OF CHEMICALS FROM PYROLYSIS OIL

(75) Inventor: Michael J. McCall, Geneva, IL (US)

(73) Assignee: UOP LLC, Des Plaines, IL (US)

( * ) Notice: Subject to any disclaimer, the term of this patent is extended or adjusted under 35 U.S.C. 154(b) by 926 days.

(21) Appl. No.: 11/763,533

(22) Filed: Jun. 15, 2007

(65) Prior Publication Data

US 2008/0312476 A1 Dec. 18, 2008

(51) Int. Cl.
C07C 7/00 (2006.01)

(52) U.S. Cl. ......... 585/802; 585/242; 518/726; 562/400

(58) Field of Classification Search .......................... None
See application file for complete search history.

(56) References Cited

U.S. PATENT DOCUMENTS

| | | | |
|---|---|---|---|
| 2,937,158 A | 5/1960 | Synder | |
| 2,947,739 A | 8/1960 | Gaslini | |
| 3,223,698 A | 12/1965 | Oshima et al. | |
| 3,966,586 A | 6/1976 | Owen et al. | 208/120 |
| 4,052,292 A | 10/1977 | Espenscheid et al. | |
| 4,115,075 A | 9/1978 | McNamee et al. | |
| 4,139,453 A | 2/1979 | Hutchings | 208/213 |
| 4,300,009 A | 11/1981 | Haag et al. | |
| 4,420,644 A | 12/1983 | Huibers et al. | |
| 4,422,959 A | 12/1983 | Lawson et al. | 502/247 |
| 4,464,481 A * | 8/1984 | Hilfman et al. | 502/228 |
| 4,501,655 A | 2/1985 | Hilfman et al. | 208/110 |
| 4,591,426 A | 5/1986 | Krasuk et al. | 208/96 |
| 4,731,491 A | 3/1988 | Urban et al. | |
| 4,739,040 A | 4/1988 | Naae et al. | |
| 4,891,459 A | 1/1990 | Knight et al. | |
| 4,935,567 A | 6/1990 | Yokoyama et al. | |
| 4,952,306 A | 8/1990 | Sawyer et al. | 208/216 R |
| 5,178,749 A | 1/1993 | Lopez et al. | 208/58 |
| 5,186,815 A | 2/1993 | Lenglet | 208/48 R |
| 5,294,329 A | 3/1994 | Kramer | 208/108 |
| 5,298,152 A | 3/1994 | Kramer | 208/108 |
| 5,300,212 A | 4/1994 | Winter, Jr. | 208/67 |
| 5,420,088 A | 5/1995 | Silva et al. | 502/22 |
| 5,536,325 A | 7/1996 | Brink | |
| 5,935,418 A | 8/1999 | Chakrabarty et al. | 208/108 |
| 5,959,167 A | 9/1999 | Shabtai et al. | 585/242 |
| 5,961,821 A | 10/1999 | Varadaraj et al. | 208/263 |
| 5,977,192 A | 11/1999 | Howsmon et al. | 518/700 |
| 6,043,392 A | 3/2000 | Holtzapple et al. | |
| 6,090,859 A | 7/2000 | Howsmon et al. | 518/715 |
| 6,096,192 A | 8/2000 | Myers et al. | 208/108 |
| 6,096,196 A | 8/2000 | Varadaraj et al. | 208/263 |
| 6,100,385 A | 8/2000 | Naae et al. | |
| 6,162,350 A | 12/2000 | Soled et al. | 208/113 |
| 6,171,471 B1 | 1/2001 | Ferrughelli et al. | 208/96 |
| 6,172,272 B1 | 1/2001 | Shabtai et al. | |
| 6,183,629 B1 | 2/2001 | Bando et al. | |
| 6,207,808 B1 | 3/2001 | Naae et al. | |
| 6,277,269 B1 | 8/2001 | Myers et al. | 208/19 |
| 6,355,159 B1 | 3/2002 | Myers et al. | 208/108 |
| 6,454,936 B1 | 9/2002 | Varadaraj | 208/263 |
| 6,511,937 B1 | 1/2003 | Bearden, Jr. et al. | 502/180 |
| 6,620,313 B1 | 9/2003 | Demmin et al. | 208/112 |
| 6,660,157 B2 | 12/2003 | Que et al. | 208/108 |
| 6,712,955 B1 | 3/2004 | Hou et al. | |
| 7,128,827 B2 | 10/2006 | Tallman et al. | 208/78 |
| 7,314,190 B2 | 1/2008 | Palm | |
| 7,469,846 B2 | 12/2008 | Schu | |
| 7,503,981 B2 | 3/2009 | Wyman et al. | |
| 7,541,503 B2 | 6/2009 | Shoshany | |
| 7,600,707 B2 | 10/2009 | Wingerson | |
| 2003/0100807 A1 | 5/2003 | Shabtai et al. | |
| 2003/0115792 A1 | 6/2003 | Shabtai et al. | |
| 2003/0221361 A1 | 12/2003 | Russell et al. | |
| 2004/0108085 A1 | 6/2004 | Kettenbach et al. | |
| 2004/0121436 A1 | 6/2004 | Blount | |
| 2005/0119116 A1 | 6/2005 | Espinoza et al. | |
| 2005/0164355 A1 | 7/2005 | Vlasenko et al. | |
| 2006/0243323 A1 | 11/2006 | Wantling et al. | |
| 2007/0125369 A1 | 6/2007 | Olson et al. | |
| 2007/0135669 A1 | 6/2007 | Koivusalmi et al. | |
| 2008/0050792 A1 | 2/2008 | Zmierczak et al. | |
| 2008/0058563 A1 | 3/2008 | Dumesic et al. | |
| 2008/0312346 A1 | 12/2008 | McCall et al. | |
| 2008/0312476 A1 | 12/2008 | McCall | |
| 2008/0312479 A1 | 12/2008 | McCall et al. | |

FOREIGN PATENT DOCUMENTS

| | | |
|---|---|---|
| EP | 010243 B1 | 3/1981 |
| JP | 57183484 | 11/1982 |
| WO | WO 2006119219 A3 | 11/2006 |

OTHER PUBLICATIONS

Mohan et al (Energy & Fuels, 2006, vol. 20, No. 3, pp. 848-889).*
Elliott, D. et al. "Developments in Direct Thermochemical Liquefaction of Biomass: 1983-1990" 1991 American Chemical Society pp. 399-410.
Demirbas, A. et al. "Effect of lignin content on aqueous liquefaction products of biomass" 2000 Elsevier Science Ltd., pp. 1601-1607.
Qu, Y. et al. "Experimental study on the direct liquefaction of *Cunninghamia lanceolata* in water" Energy 28, published by Elsevier Science Ltd. (2003), pp. 597-606.
Kim, T. et al. "Fractionation of corn stover by hot-water and aqueous ammonia treatment" Bioresource Technology 97 (2006), 2005 published by Elsevier Ltd. pp. 224-232.
Gupta, D. et al. "Catalytic Hydrogenation and Hydrocracking of Oxygenated Compounds to Liquid and Gaseous Fuels" Ind. Eng. Chem., Process Des. Dev., vol. 15, No. 2, 1976 pp. 256-260.
Boocock, D. et al. "The Production of Synthetic Organic Liquids from Wood Using a Modified Nickel Catalyst" The Canadian Journal of Chemical Engineering, vol. 58, Aug. 1980 pp. 466-469.
Huibers, D. et al. "Fuels and Chemical Feedstocks from Lignocellulosic Biomass" The Canadian Journal of Chemical Engineering, vol. 58, Dec. 1980 pp. 718-722.
Gevert, B. et al. "Upgrading of Directly Liquefied Biomass to Transportation Fuels: Catalytic Cracking" 1987 Elsevier Applied Science Publishers Ltd., England pp. 173-183.
Walton, T. et al. "Conversion of cellulose to hydrocarbons" Fuel, 1981, vol. 60, Aug. 1981 IPC Business Press, pp. 650-654.

(Continued)

*Primary Examiner* — Sudhakar Katakam
(74) *Attorney, Agent, or Firm* — Arthur E Gooding

(57) ABSTRACT

A process for the recovery of organic chemical feedstocks from biooil is presented. The process comprises separating the water soluble chemicals from biomass and recovering the primarily oxygenate compounds for use as feedstocks.

16 Claims, No Drawings

OTHER PUBLICATIONS

Kranich, W. et al. "Oil and Gas from Cellulose by Catalytic Hydrogenation" The Canadian Journal of Chemical Engineering, vol. 58, Dec. 1980, pp. 735-738.

Petrus, L. et al. "Biomass to biofuels, a chemical perspective" journal: The Royal Society of Chemistry 2006, Green Chem., 2006, 8, pp. 861-867.

Solantausta, Y. et al. "Assessment of Liquefaction and Pyrolysis Systems" 1992 Pergamon Press Ltd., Biomass and Bioenergy vol. 2, Nos. 1-6, pp. 279-297.

Demirbas, A. "Aqueous Glycerol Delignification of Wood Chips and Ground Wood" 1998 Elsevier Science Ltd., Great Britain, Bioresource Technology 63 (1998) pp. 179-185.

Rezzoug et al. "Solvolysis and Hydrotreatment of Wood to Provide Fuel", Biomass and Bioengery vol. 1 I, No. 4. pp. 343-352, 1996.

Aronovsky et al. The Cooking Process XI. Pulping Wood with Alcohols and other Organic Reagents, Industrial and Engineering Chemistry 28, 1936, 1270-1276.

Potassium Carbonate, Hawley's Condensed Chemical Dictionary, 14th Edition, 2002.

* cited by examiner

PRODUCTION OF CHEMICALS FROM PYROLYSIS OIL

FIELD OF THE INVENTION

This invention relates to processes for obtaining hydrocarbons from biomass. More particularly, this invention relates to the treatment of pyrolytic lignin and cellulosic waste produced from pyrolysis of lignin and cellulosic waste to produce chemicals that are not used as a fuel.

BACKGROUND OF THE INVENTION

Renewable sources of chemicals are of increasing importance. They are a means of reducing dependence on imported oil for conversion to plastic precursors and provide a substitute for basic chemical precursors. Renewable resources can provide for basic chemical constituents to be used in many industries, such as chemical monomers for the making of plastics and biomass is a renewable resource that can provide some of the needs for sources of chemicals and fuels.

Biomass includes, but is not limited to, plant parts, fruits, vegetables, wood chips, chaff, grain, grasses, corn, corn husks, weeds, aquatic plants, hay, paper, paper products, recycled paper and paper products, and any cellulose containing biological material or material of biological origin. The economics depend on the ability to produce large amounts of biomass on marginal land, by increasing the yield per acre, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. In addition, biomass contributes to the removal of carbon dioxide from the atmosphere as the biomass grows. The use of biomass can be one process for recycling atmospheric carbon while producing fuels and chemical precursors. Biomass when heated rapidly in an environment with low or no oxygen will generate a liquid product known as pyrolysis oil.

Pyrolysis oil, also known as biooil, is a source of bio fuel, but can also be a source of chemical feedstocks for other uses.

SUMMARY OF THE INVENTION

The invention provides a process for producing precursor chemicals from biooil for use as purified chemical feedstocks. Biooil comprises a substantial amount of oxygenates that have value as chemical feedstocks instead of burning the biooil as fuel. The process comprises separating the biooil into a water soluble stream and water insoluble stream comprising pyrolytic lignin, lignocellulosic materials, and lignocellulosic bio-polymer derivatives. The water soluble stream is concentrated by removing the water, thereby creating a concentrated organic phase. The concentrated organic phase is passed to a catalytic reactor to upgrade the organic compounds. In an alternate embodiment, the water insoluble phase is hydrotreated to increase the yields of oxygenates.

Other objects, advantages and applications of the present invention will become apparent to those skilled in the art from the following detailed description.

DETAILED DESCRIPTION OF THE INVENTION

In the U.S., there are huge amounts of cellulosic waste, or biomass, which is not utilized, but is left to decay, often in a landfill, or just in an open field. The material includes large amounts of wood waste products, and leaves and stalks of crops or other plant material that is regularly discarded and left to decay in fields. This material can be pyrolyzed to make a pyrolysis oil, or biooil, but due to the high water content of the materials, often greater than 25%, high total acid number of approximately 70 to 200, and phase incompatibility with petroleum based materials, pyrolysis oil has often found little use. However, biooil contains valuable products, in addition to potential fuels, which can be recovered with new processing methods.

Currently, biooil is looked at for its fuel content, and the best heating value derived from the biooil comes from the pyrolytic lignin, or heavy phase. This heavy phase can be isolated from the whole oil. Other products from the lighter phase, including treated lignin, liquids derived from cellulosic waste, and liquids derived from the rest of waste biomaterial may be used as a low quality fuel or disposed of for lack of value. However, the lighter, water soluble portion of the biooil contains substantial amounts of organic chemicals that are industrially useful. Useful chemical precursors can also be produced from pyrolytic lignin that has been treated instead of burning the resulting product as fuel. Table 1 shows a typical makeup of pyrolysis oil.

TABLE 1

| Makeup of Pyrolysis Oil | |
|---|---|
| Component | Wt. % |
| Water | 20-30 |
| Pyrolytic Lignin | 15-30 |
| Aldehydes | 10-20 |
| Carboxylic acids | 10-15 |
| Carbohydrates | 5-10 |
| Phenols | 2-5 |
| Furfurals | 1-4 |
| Alcohols | 2-5 |
| Ketones | 1-5 |

The invention comprises a process for producing chemical precursors from biooil. The biooil is first separated into a non-aqueous stream comprising pyrolytic lignin and an aqueous stream comprising water soluble oxygenates. The water aqueous stream can make up 50 to 80% of the biooil. The aqueous phase is then concentrated by removing the water thereby creating a concentrated organic phase. And finally, the concentrated organic phase is passed to a catalytic reactor to upgrade the organic compounds.

The separation of the pyrolytic lignin from the aqueous stream can occur in the pyrolysis step if proper processing conditions are found. The separation can be performed with a gravimetric filtration process, where the denser lignin phase settles and the lighter aqueous phase is removed. The separation step can include adding water to enhance the recovery of oxygenates in the biooil by dissolving the oxygenates to increase recovery. After separating the aqueous phase from the pyrolytic lignin, the process concentrates the dissolved organic compounds by removal of water.

The concentrating can be performed by a number of processes, including, but not limited to, evaporation, distillation, extraction, membrane separation, adsorption separation, or some combination thereof. Multiple concentration steps can be useful due to the nature of the organic mixture, where some of the organic compounds are more easily removed than others from an aqueous mixture, and where water is more easily removed after an initial separation of lighter organic compounds.

The process further comprises separating the concentrated organic phase into a plurality of intermediate product streams. Chemicals of value for use other than as a fuel present in the organic phase include ketones, alcohols, phenols, carboxylic acids, and carbohydrates. There are many valuable oxygenates in the concentrated organic phase, and the separation of the organic phase can produce a stream comprising aldehydes, a stream comprising organic acids, a stream comprising ketones, a stream comprising phenols, and a stream comprising non-aromatic alcohols.

Examples of recoverable chemicals in the aldehyde stream include formaldehyde, acetaldehyde, hydroxyacetaldehyde, and glyoxal. Examples of recoverable organic acids include formic acid, acetic acid, propionic acid, and larger organic acids. Examples of recoverable phenols include phenol and cresols. Examples of recoverable ketones include acetol and cyclopentanone. Examples of recoverable alcohols include methanol, ethanol, and larger alcohols and glycols.

The concentration of the organics in the aqueous phase can be mixed with the separation processes used to isolate individual constituents, or groups of constituents.

In one embodiment, the biooil can be pretreated by hydrotreating the biooil prior to separation. The pretreatment can increase the yield of water soluble chemicals by mild reaction of some of the lignin. The hydrotreating comprises contacting the biooil with a hydrotreating catalyst that is stable to alkali and alkaline earth metals. An alternative step in the pretreatment is to treat the biooil to remove alkali and alkaline earth metals, followed by mild hydrotreating of the biooil.

In another embodiment, without any hydrotreating of the biooil, the removal of contaminants is important for the downstream purification of the recovered compounds. The treatment of the water soluble phase prior to separation can depend on the choice of separation processes, as well as the equipment used to separate the compounds. The treatment of the water soluble phase for the removal of alkali and alkaline earth metals prior to the removal of water to concentrate the organic phase can protect equipment from deposits.

One embodiment comprises partially deoxygenating the biooil thereby creating an intermediate stream comprising aromatic compounds, oxygenates and water. The intermediate stream is separated into an aqueous stream comprising water soluble oxygenates and an organic stream comprising aromatic compounds. The aqueous stream is then concentrated by removing water to create a concentrated organic phase comprising oxygenates. The process can be enhanced with the addition of water to recover oxygenates that can be partially dissolved in the organic stream.

In another embodiment, the process comprises hydrotreating the pyrolytic lignin to increase the yields of oxygenates from the biooil.

The deoxygenation process comprises hydroprocessing the pyrolysis oil by passing the oil to hydrotreating unit where the oil is contacted with a hydrotreating catalyst under a hydrogen atmosphere. The hydrotreating unit can also be a hydrocracking unit with a hydrocracking catalyst for breaking additional oxygenates out of the lignin compounds.

In another embodiment, the process concentrates the biooil by removing water from the biooil and creating a concentrated biooil stream. The concentrated biooil is separated into at least two streams using separation methods known to those skilled in the art. Among the separated streams include one comprising distillable oxygenates, one comprising distillable hydrocarbons, and a residual stream comprising non-distillable components comprising pyrolytic lignin. The concentrated biooil stream may contain multiple liquid phases and the multiple liquid phases can be separated through a gravimetric separation process.

After separating the pyrolytic lignin from the other components of the biooil, the pyrolytic lignin stream can be mixed with water to further extract water soluble oxygenates into an aqueous stream. The aqueous stream can be further concentrated to generate a concentrated oxygenate stream to be combined with other oxygenate streams.

The non-distillable stream can also be subject to extraction methods to recover hydrocarbons that are not recoverable with water extraction.

The formation of catalysts useable in these processes are described in U.S. Pat. No. 4,501,655, which is incorporated by reference in its entirety. Catalysts useable for this process include large pore zeolites for allowing larger molecules into the pores for cracking into smaller molecular constituents. Examples of zeolites include, but are not limited to, beta zeolite, Y-zeolite, MFI type zeolites, mordenite, silicalite, SM3, and faujasite. The catalyst can also be an amorphous silica-alumina catalyst, an amorphous alumina catalyst, or a combined zeolitic and amorphous silica-alumina catalyst. It is preferred that the catalyst includes a metal deposited on the catalyst. Metals useable for this process include a metal selected from nickel (Ni), chromium (Cr), molybdenum (Mo), and tungsten (W). The metal content deposited on the catalysts used are deposited in amounts ranging from 0.1 wt. % to 20 wt. %, with preferred values for the metals including, but not limited to, nickel in a range from 0.5 wt. % to 10 wt. %, tungsten in a range from 5 wt. % to 20 wt. %, and molybdenum in a range from 5 wt. % to 20 wt. %. The metals can also be deposited in combinations on the catalysts with preferred combinations being Ni with W, and Ni with Mo. In another embodiment, the metals deposited on the catalyst are in the sulfided form, and preferred sulfided combinations include NiWS, and NiMoS.

The biomass is treated under mild hydrotreating conditions, which include operating at a temperature between 200° C. and 500° C., and preferably between 300° C. and 400° C. The process is carried out under a hydrogen atmosphere and at a pressure between 3.5 MPa (500 psia) and 17.5 MPa (2500 psia), and preferably between 670 kPa (100 psia) and 13.8 MPa (2000 psia), and at space velocities (WHSV) from 0.1 $hr^{-1}$ to 5.0 $hr^{-1}$.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for obtaining chemical precursors from biooil, the process comprising the steps of:
   lightly hydrotreating the biooil, wherein the lightly hydrotreating conditions comprises a temperature between 300° C. and 400° C., under a hydrogen partial between preferably between 670 kPa and 13.8 MPa, and at space velocities (WHSV) from 0.1 $hr^{-1}$ to 5.0 $hr^{-1}$;
   separating the biooil after the step of lightly hydrotreating into a first stream comprising a water-soluble phase and a second stream comprising pyrolytic lignin;
   lightly hydrotreating the pyrolytic lignin phase to increase the yields of oxygenated compounds;
   concentrating the water-soluble phase by removing water thereby creating a concentrated organic phase of organic compounds comprising ketones, alcohols, phenols, carboxylic acids, carbohydrates, and mixtures thereof; and passing the concentrated organic phase to a catalytic reactor to upgrade the organic compounds.

2. The process of claim 1 further comprising the step of separating the concentrated organic phase into a plurality of concentrated streams comprising a first concentrated stream comprising aldehydes, a second concentrated stream comprising organic acids, a third concentrated stream comprising ketones, a fourth concentrated stream comprising phenols, and a fifth concentrated stream comprising non-aromatic alcohols, and wherein the step of passing comprises passing at least one of the plurality of concentrated streams to the catalytic reactor.

3. The process of claim 1 wherein the step of separating comprises using a gravimetric filtration process to separate the biooil.

4. The process of claim 1 wherein the step of separating comprises adding water to the biooil to create an aqueous phase.

5. The process of claim 1 wherein the step of concentrating the water-soluble phase comprises removing water from the water-soluble phase using a separation process selected from the group consisting of evaporation, distillation, extraction, membrane separation, adsorption separation, and combinations thereof.

6. The process of claim 1 further comprising the step of pretreating the biooil prior to the step of lightly hydrotreating to remove alkali and alkaline earth metals and to form a pretreated biooil, and wherein the step of lightly hydrotreating comprises contacting the pretreated biooil with a hydrotreating catalyst and the step of separating the biooil comprises separating the pretreated biooil into the first stream and the second stream.

7. The process of claim 1 wherein the step of lightly hydrotreating comprises contacting the biooil with a hydrotreating catalyst that is stable to alkali and alkaline earth metals.

8. A process for obtaining chemical precursors from biooil, the process comprising the steps of:
    lightly hydrotreating the biooil, wherein the lightly hydrotreating conditions comprises a temperature between 300° C. and 400° C., under a hydrogen partial between preferably between 670 kPa and 13.8 MPa, and at space velocities (WHSV) from 0.1 $hr^{-1}$ to 5.0 $hr^{-1}$;
    separating the biooil into a first stream comprising a water-soluble phase and a second stream comprising pyrolytic lignin;
    pretreating the water-soluble phase to remove alkali and alkaline earth metals;
    concentrating the water-soluble phase after the step of pretreating by removing water thereby creating a concentrated organic phase of organic compounds comprising ketones, alcohols, phenols, carboxylic acids, carbohydrates, and mixtures thereof; and
    passing the concentrated organic phase to a catalytic reactor to upgrade the organic compounds.

9. A process for obtaining chemical precursors from pyrolysis oil formed from pyrolyzing biomass, the process comprising the steps of:
    partially deoxygenating the pyrolysis oil comprising biooil to produce an intermediate stream comprising aromatic compounds, oxygenates and water, the biooil comprising water, pyrolytic lignin, aldehydes, carboxylic acids, carbohydrates, phenols, furfurals, alcohols, ketones, and mixtures thereof, wherein the partial deoxygenation of the pyrolysis oil comprising hydrotreating the pyrolysis oil in a hydrotreating unit, under hydrotreating conditions comprising a temperature between 300° C. and 400° C., under a hydrogen partial between preferably between 670 kPa and 13.8 MPa, and at space velocities (WHSV) from 0.1 $hr^{-1}$ to 5.0 $hr^{-1}$;
    separating the intermediate stream into a first stream comprising a water-soluble phase that comprises organic compounds including oxygenates and a second stream comprising aromatic compounds;
    concentrating the first stream by removing water, thereby creating a concentrated organic phase; and
    passing the concentrated organic phase to a catalytic reactor to upgrade the organic compounds.

10. The process of claim 9 further comprising the step of adding chemical agents to the pyrolysis oil for solubilizing and dispersing solids in the pyrolysis oil prior to the step of partially deoxygenating.

11. The process of claim 9 wherein the step of separating comprises using a gravimetric filtration process to separate the intermediate stream.

12. The process of claim 9 wherein the step of separating comprises adding water to the pyrolysis oil to create an aqueous phase.

13. The process of claim 9 wherein the step of concentrating the water-soluble phase comprises using a separation process selected from the group consisting of evaporation, distillation, extraction, membrane separation, adsorption separation, and combinations thereof.

14. The process of claim 8 further comprising the step of separating the concentrated organic phase into a plurality of concentrated streams comprising at least a concentrated first stream comprising aldehydes, a second concentrated stream comprising organic acids, a third concentrated stream comprising ketones, a fourth concentrated stream comprising phenols, and a fifth concentrated stream comprising non-aromatic alcohols, and wherein the step of passing comprises passing the plurality of concentrated streams to the catalytic reactor.

15. The process of claim 8 wherein the step of separating comprises adding water to the biooil to create an aqueous phase.

16. The process of claim 8 wherein the step of concentrating the water-soluble phase comprises removing water from the water-soluble phase using a separation process selected from the group consisting of evaporation, distillation, extraction, membrane separation, adsorption separation, and combinations thereof.

\* \* \* \* \*